US012652581B2

(12) United States Patent
Yuan et al.

(10) Patent No.: US 12,652,581 B2
(45) Date of Patent: Jun. 9, 2026

(54) INTERNET PROTOCOL MULTIMEDIA SUBSYSTEM SIGNALING DURING FALLBACK TO A LEGACY CELL

(71) Applicant: QUALCOMM Incorporated, San Diego, CA (US)

(72) Inventors: Zhanzhong Yuan, Shenzhen (CN); Haojun Wang, Xian (CN); Jinglin Zhang, Shenzhen (CN); Yuanqiang Cai, Shenzhen (CN); Zhenqing Cui, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/253,575

(22) PCT Filed: Jan. 7, 2021

(86) PCT No.: PCT/CN2021/070594
§ 371 (c)(1),
(2) Date: May 18, 2023

(87) PCT Pub. No.: WO2022/147706
PCT Pub. Date: Jul. 14, 2022

(65) Prior Publication Data
US 2024/0007907 A1     Jan. 4, 2024

(51) Int. Cl.
*H04W 36/00* (2009.01)
(52) U.S. Cl.
CPC .............................. *H04W 36/00226* (2023.05)
(58) Field of Classification Search
CPC ................................................ H04W 36/00226
See application file for complete search history.

(56) References Cited

U.S. PATENT DOCUMENTS

| | | | |
|---|---|---|---|
| 2018/0063755 A1 | 3/2018 | Chong et al. | |
| 2018/0227219 A1* | 8/2018 | Zhang | H04L 47/34 |

(Continued)

FOREIGN PATENT DOCUMENTS

| | | |
|---|---|---|
| CN | 111385849 A | 7/2020 |
| WO | 2019061265 A1 | 4/2019 |

(Continued)

OTHER PUBLICATIONS

International Search Report and Written Opinion—PCT/CN2021/070594—ISA/EPO—Oct. 12, 2021.
Bellavista P., et al., "IMS-Compliant Management of Vertical Handoffs for Mobile Multimedia Session Continuity", IEEE Communications Magazine, IEEE Service Center, Piscataway, US, vol. 48, No. 4, Apr. 1, 2010, pp. 114-121, XP011306103, chapter IHMAS application layer Handoff Enhancement, p. 116, right-hand column, last paragraph, p. 115, right-hand column, figure 1.

(Continued)

*Primary Examiner* — Jason E Mattis
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a New Radio (NR) cell, an Internet protocol multimedia subsystem (IMS) configuration message. The UE may receive, from the NR cell, an instruction to fallback to a legacy cell. The UE may store a response to the IMS configuration message based at least in part on receiving the instruction to fallback. The UE may transmit, to the legacy cell and before transmitting another IMS message, the response to the IMS configuration message. Numerous other aspects are described.

28 Claims, 8 Drawing Sheets

(56)      References Cited

U.S. PATENT DOCUMENTS

| | | | |
|---|---|---|---|
| 2019/0090165 A1 | 3/2019 | Huang-Fu et al. | |
| 2020/0053133 A1* | 2/2020 | Atarius | H04L 69/164 |
| 2020/0112887 A1 | 4/2020 | Kwok et al. | |
| 2020/0245195 A1 | 7/2020 | Zhu et al. | |
| 2020/0314702 A1 | 10/2020 | Rahman | |
| 2020/0374761 A1 | 11/2020 | Zhu et al. | |
| 2021/0160186 A1* | 5/2021 | Xu | H04W 48/14 |
| 2021/0352690 A1* | 11/2021 | Shin | H04L 5/0091 |
| 2022/0386183 A1* | 12/2022 | Guo | H04L 65/1016 |

FOREIGN PATENT DOCUMENTS

| | | | |
|---|---|---|---|
| WO | 2020076934 A1 | 4/2020 | |
| WO | 2020160177 A1 | 8/2020 | |

OTHER PUBLICATIONS

Qualcomm Incorporated., et al., "EPS Fallback Issues", 3GPP TSG-RAN2#107, R2-1909478, 3rd Generation Partnership Project (3GPP), Mobile Competence Centre, 650, Route Des Lucioles, F-06921 Sophia-Antipolis Cedex, France, vol. RAN WG2, No. Prague, Czech, Aug. 26, 2019-Aug. 30, 2019, Aug. 16, 2019, 5 Pages, XP051767275, chapter 2.1.

Supplementary European Search Report—EP21916764—Search Authority—Munich—Sep. 19, 2024.

Motorola Mobility—Lenovo: "EPS Fallback for an IMS Session Setup", 3GPP TSG CT WG1 Meeting #110, C1-182176, Kunming (P.R. of China), Apr. 16, 2018-Apr. 20, 2018, Apr. 9, 2018, 10 Pages.

* cited by examiner

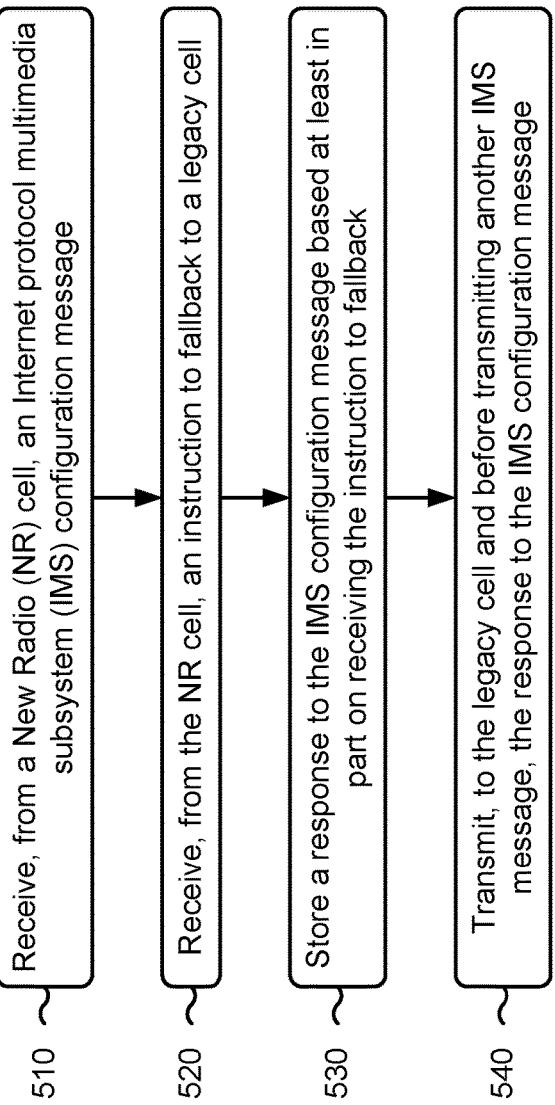

510 — Receive, from a New Radio (NR) cell, an Internet protocol multimedia subsystem (IMS) configuration message 520 — Receive, from the NR cell, an instruction to fallback to a legacy cell 530 — Store a response to the IMS configuration message based at least in part on receiving the instruction to fallback 540 — Transmit, to the legacy cell and before transmitting another IMS message, the response to the IMS configuration message

610 — Receive, from a user equipment (UE), a request to connect, wherein the request to connected is based at least in part on an instruction to fallback from a New Radio (NR) cell 620 — Receive, from the UE and before receiving another Internet protocol multimedia subsystem (IMS) message, a response to an IMS configuration message that was sent by the NR cell

INTERNET PROTOCOL MULTIMEDIA SUBSYSTEM SIGNALING DURING FALLBACK TO A LEGACY CELL

CROSS-REFERENCE TO RELATED APPLICATION

This application is a 35 U.S.C. 371 national stage application of PCT Application No. PCT/CN2021/070594, filed on Jan. 7, 2021, entitled "INTERNET PROTOCOL MULTIMEDIA SUBSYSTEM SIGNALING DURING FALLBACK TO A LEGACY CELL," which is expressly incorporated by reference herein.

FIELD OF THE DISCLOSURE

Aspects of the present disclosure generally relate to wireless communication and to techniques and apparatuses for Internet protocol multimedia subsystem signaling during fallback to a legacy cell.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to receive, from a New Radio (NR) cell, an Internet protocol multimedia subsystem (IMS) configuration message; receive, from the NR cell, an instruction to fallback to a legacy cell; store a response to the IMS configuration message based at least in part on receiving the instruction to fallback; and transmit, to the legacy cell and before transmitting another IMS message, the response to the IMS configuration message.

In some aspects, a base station for wireless communication includes a memory and one or more processors operatively coupled to the memory, the memory and the one or more processors configured to receive, from a UE, a request to connect, wherein the request to connected is based at least in part on an instruction to fallback from an NR cell; and receive, from the UE and before receiving another IMS message, a response to an IMS configuration message that was sent by the NR cell.

In some aspects, a method of wireless communication performed by a UE includes receiving, from an NR cell, an IMS configuration message; receiving, from the NR cell, an instruction to fallback to a legacy cell; storing a response to the IMS configuration message based at least in part on receiving the instruction to fallback; and transmitting, to the legacy cell and before transmitting another IMS message, the response to the IMS configuration message.

In some aspects, a method of wireless communication performed by a base station includes receiving, from a UE, a request to connect, wherein the request to connected is based at least in part on an instruction to fallback from an NR cell; and receiving, from the UE and before receiving another IMS message, a response to an IMS configuration message that was sent by the NR cell.

In some aspects, a non-transitory computer-readable medium storing a set of instructions for wireless communication includes one or more instructions that, when executed by one or more processors of a UE, cause the UE to receive, from an NR cell, an IMS configuration message; receive, from the NR cell, an instruction to fallback to a legacy cell; store a response to the IMS configuration message based at least in part on receiving the instruction to fallback; and transmit, to the legacy cell and before transmitting another IMS message, the response to the IMS configuration message.

In some aspects, a non-transitory computer-readable medium storing a set of instructions for wireless communication includes one or more instructions that, when executed by one or more processors of a base station, cause the base station to receive, from a UE, a request to connect, wherein the request to connected is based at least in part on an instruction to fallback from an NR cell; and receive, from the UE and before receiving another IMS message, a response to an IMS configuration message that was sent by the NR cell.

In some aspects, an apparatus for wireless communication includes means for receiving, from an NR cell, an IMS configuration message; means for receiving, from the NR cell, an instruction to fallback to a legacy cell; means for storing a response to the IMS configuration message based at least in part on receiving the instruction to fallback; and means for transmitting, to the legacy cell and before transmitting another IMS message, the response to the IMS configuration message.

In some aspects, an apparatus for wireless communication includes means for receiving, from a UE, a request to connect, wherein the request to connected is based at least in part on an instruction to fallback from an NR cell; and means for receiving, from the UE and before receiving another IMS message, a response to an IMS configuration message that was sent by the NR cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-6 are diagrams illustrating example processes associated with IMS signaling during fallback to a legacy cell, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
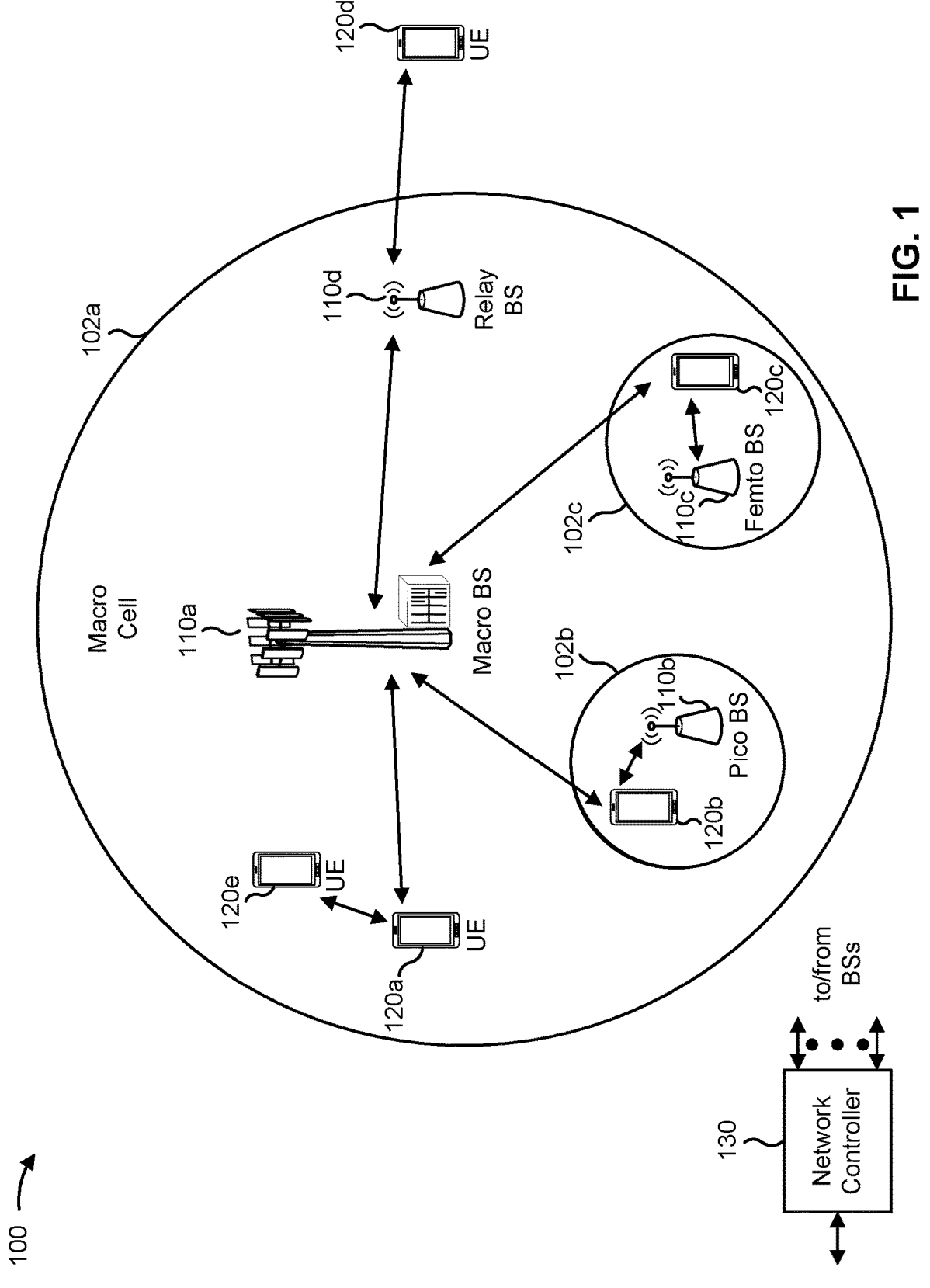
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
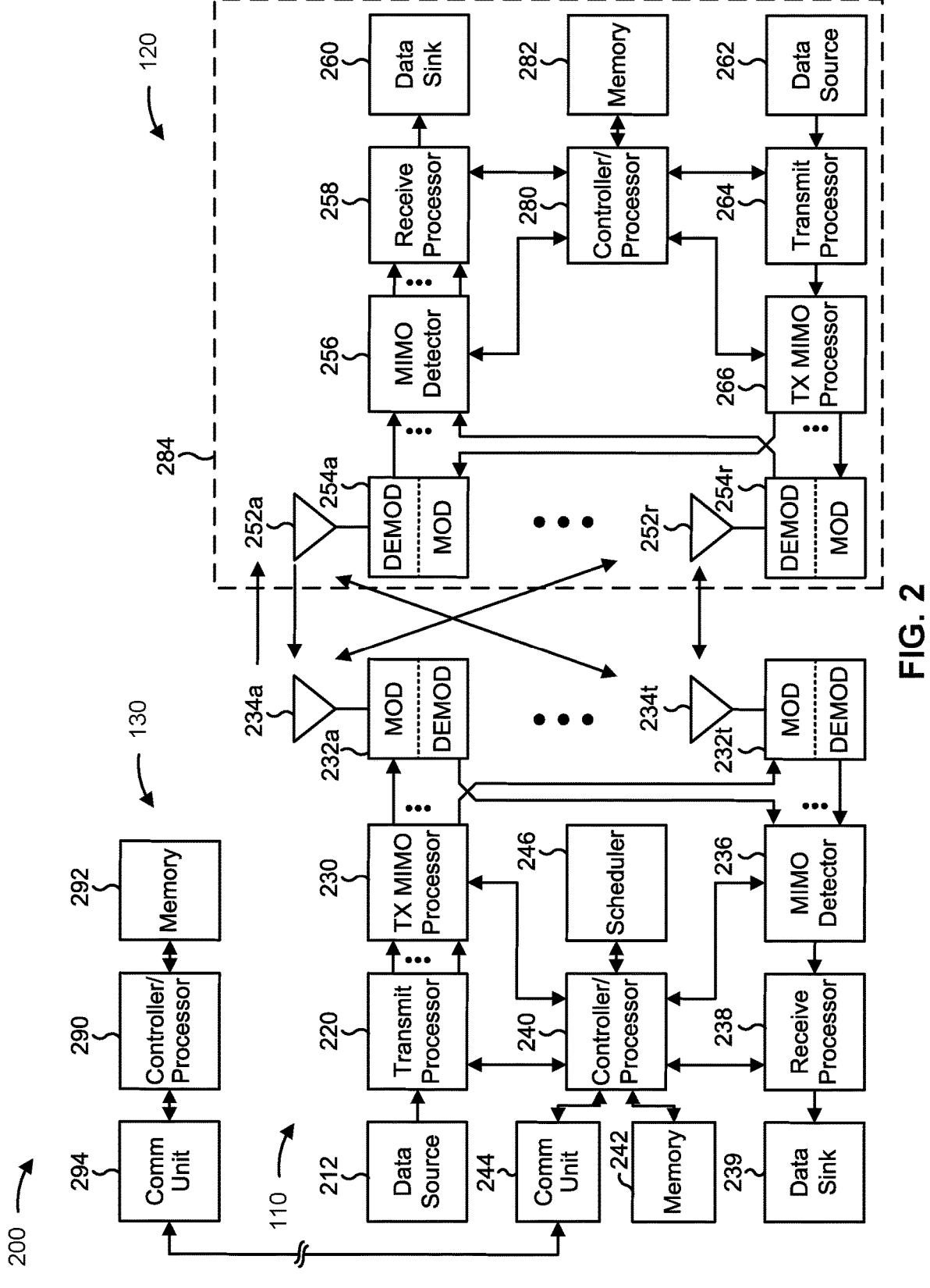
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with IMS signaling during fallback to a legacy cell, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, a UE (e.g., apparatus 700 of FIG. 7 and/or UE 120) may include means for receiving, from an NR cell, an IMS configuration message; means for receiving, from the NR cell, an instruction to fallback to a legacy cell; means for storing a response to the IMS configuration message based at least in part on receiving the instruction to fallback; and/or means for transmitting, to the legacy cell and before transmitting another IMS message, the response to the IMS configuration message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE may further include means for determining that a protocol data unit (PDU) that includes the response is associated with a 5G quality of service (QoS) identifier (5QI) that maps to a stored 5QI value, and the response is stored based at least in part on the determination. Additionally, the UE may include means for discarding one or more additional PDUs that are associated with one or more 5QIs that do not map to the stored 5QI value.

In some aspects, the UE may further include means for transmitting, to the legacy cell, an IMS ring message after transmitting the response. Additionally, or alternatively, the UE may include means for establishing, with the legacy cell, a radio resource control (RRC) connection before transmitting the response.

In some aspects, a base station (e.g., apparatus 800 of FIG. 8 and/or base station 110) may include means for receiving, from a UE (e.g., apparatus 700 of FIG. 7 and/or UE 120), a request to connect, wherein the request to connected is based at least in part on an instruction to fallback from an NR cell; and/or means for receiving, from the UE and before receiving another IMS message, a response to an IMS configuration message that was sent by the NR cell. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station may further include means for receiving, from the UE, an IMS ring message after receiving the response. Additionally, or alternatively, the base station may include means for establishing, with the UE, an RRC connection before receiving the response.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
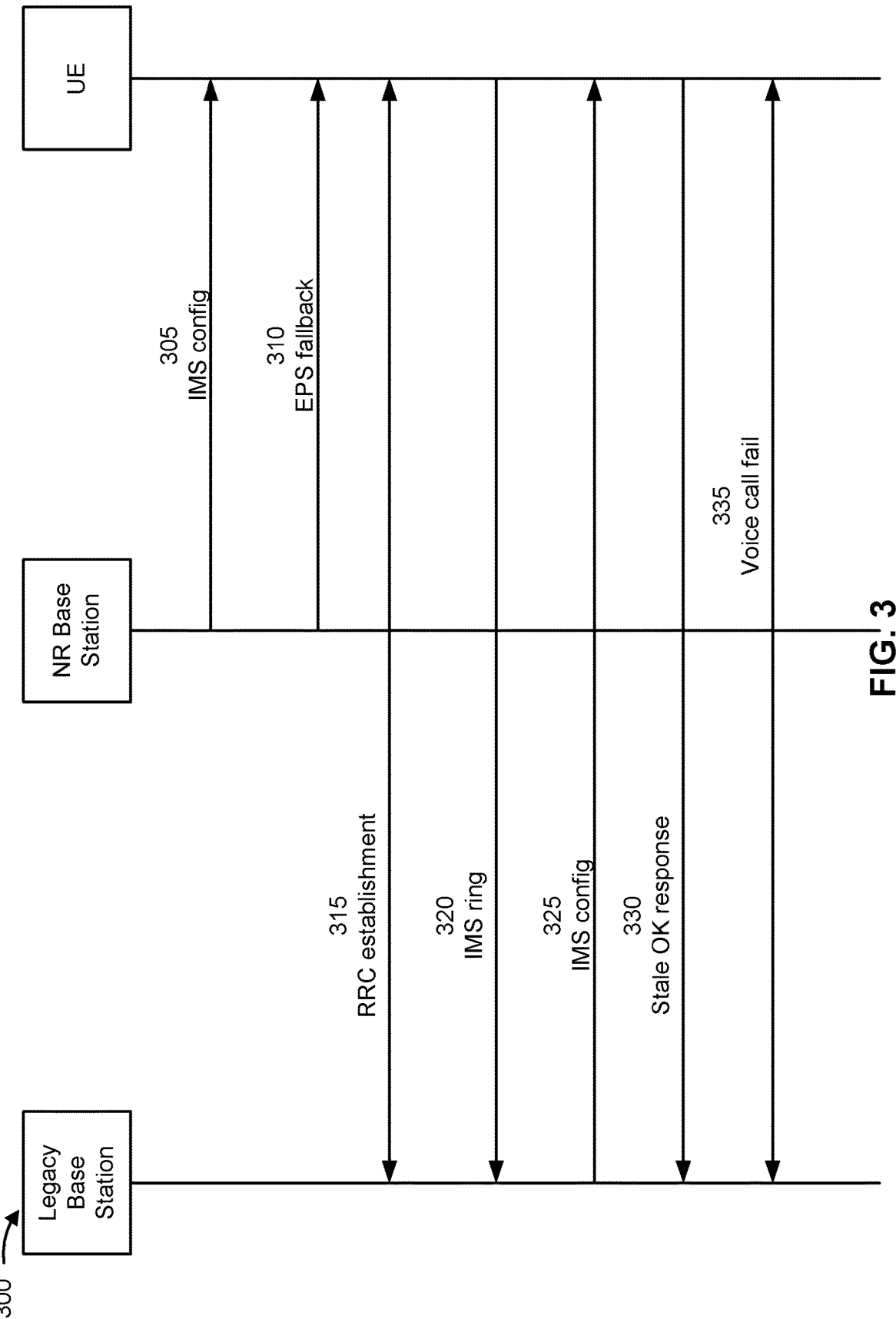
FIG. 3 is a diagram illustrating an example of voice call failure during evolved packet system (EPS) fallback, in accordance with various aspects of the present disclosure.

FIG. 3 is a diagram illustrating an example 300 of voice call failure during EPS fallback, in accordance with various aspects of the present disclosure. As shown in FIG. 3, a UE may communicate with an NR cell (e.g., via an NR base station) and a legacy cell (e.g., via a legacy base station). The NR cell may be part of a standalone (SA) 5G network or a non-standalone (NSA) 5G network that uses a same core network as a legacy network including the legacy cell. The NR cell and the legacy cell may share an IMS architecture such that the NR cell can initiate an IMS session that is finalized and conducted on the legacy cell, as described in further detail below.

In example 300, a UE may be connected to the NR cell and may request a voice call. As shown in connection with reference number 305, the NR base station may initialize an IMS session with the UE. For example, the NR base station may transmit an INVITE message as defined in the Network Working Group's Request for Comments (RFC) 3312 and/or another standard. Additionally, after reserving one or more resources on the IMS architecture, the NR base station may transmit an UPDATE message as defined in RFC 3312 and/or another standard. An IMS session may allow the NR base station to deliver IP multimedia services to the UE in order to use IP packet switching to handle the requested voice call. For example, voice over New Radio (VoNR) and voice over LTE (VoLTE) may both rely on IMS.

As shown in connection with reference number 310, the NR base station may also initiate EPS fallback. For example, the NR base station may transmit an RRCConnectionReconfiguration message as defined in 3GPP specifications and/or another standard. EPS fallback may allow the UE to use an LTE network or other legacy network to complete the requested voice call. For example, NR coverage may be less reliable where the UE is located such that the NR base station initiates EPS fallback in order to reduce a risk that the requested voice call will be dropped. Additionally, or alternatively, the UE and/or the NR base station may not be configured for VoNR services.

As shown in connection with reference number 315, the UE may establish a connection with the legacy network (e.g., via a legacy base station, which may be the same as the NR base station or a different base station). For example, the UE may initiate an RRC connection with the legacy base station, which may include establishing a random access channel (RACH) with the legacy base station. However, the UE may have been unable to transmit a response to the UPDATE message from the NR base station before establishing a connection with the legacy network. For example, the UE may have been unable to transmit a 200 OK message as defined in RFC 3312 and/or another standard. Additionally, establishing a connection with the legacy network completes the handover initiated by the EPS fallback, which causes the UE to release a PDCP entity associated with the NR network (e.g., according to 3GPP Technical Specification 38.331 and/or another standard) and to discard all PDUs, including a previously generated 200 OK message (e.g., according to 3GPP Technical Specification 38.323 and/or another standard).

Accordingly, as shown in connection with reference number 320, the UE may proceed to ring the legacy base station. For example, the UE may transmit a 180 Ringing message as defined in RFC 3312 and/or another standard. Because any pending 200 OK message has been the discarded, the UE attempts to begin the IMS session. However, the NR cell did not receive the 200 OK message, and thus the IMS architecture is not able to confirm any precondition that was included in the UPDATE message. For example, the precondition may include a QoS indicator, an indicator that the UE is configured as an EPS bearer, and/or another condition prerequisite to beginning the IMS session.

Therefore, as shown in connection with reference number 325, the legacy base station may attempt to re-transmit an UPDATE message. However, as shown in connection with reference number 330, the UE may transmit a 200 OK message that still does not satisfy the precondition that was included in the UPDATE message. For example, the UE may transmit a 200 OK message based at least in part on expecting a provisional response acknowledgement (PRACK) from the legacy base station rather than a retransmission of the UPDATE message. Accordingly, as shown in connection with reference number 335, the IMS session will not be established, and the voice call will fail.

As indicated above, FIG. 3 is provided as an example. Other examples may differ from what is described with respect to FIG. 3.

Some techniques and apparatuses described herein enable a UE (e.g., UE 120) to preserve a PDU that includes an IMS response (e.g., a 200 OK message as defined in RFC 3312 and/or another standard) during fallback to a legacy network (e.g., EPS fallback to an LTE network). Moreover, the UE may deliver the IMS response to the legacy network after the UE completes handover from an NR network to the legacy network. As a result, an IMS session will be successfully established, and the voice call will not fail. This improves the reliability and quality of the voice call as well as improving a user's experience.

Figure 4:
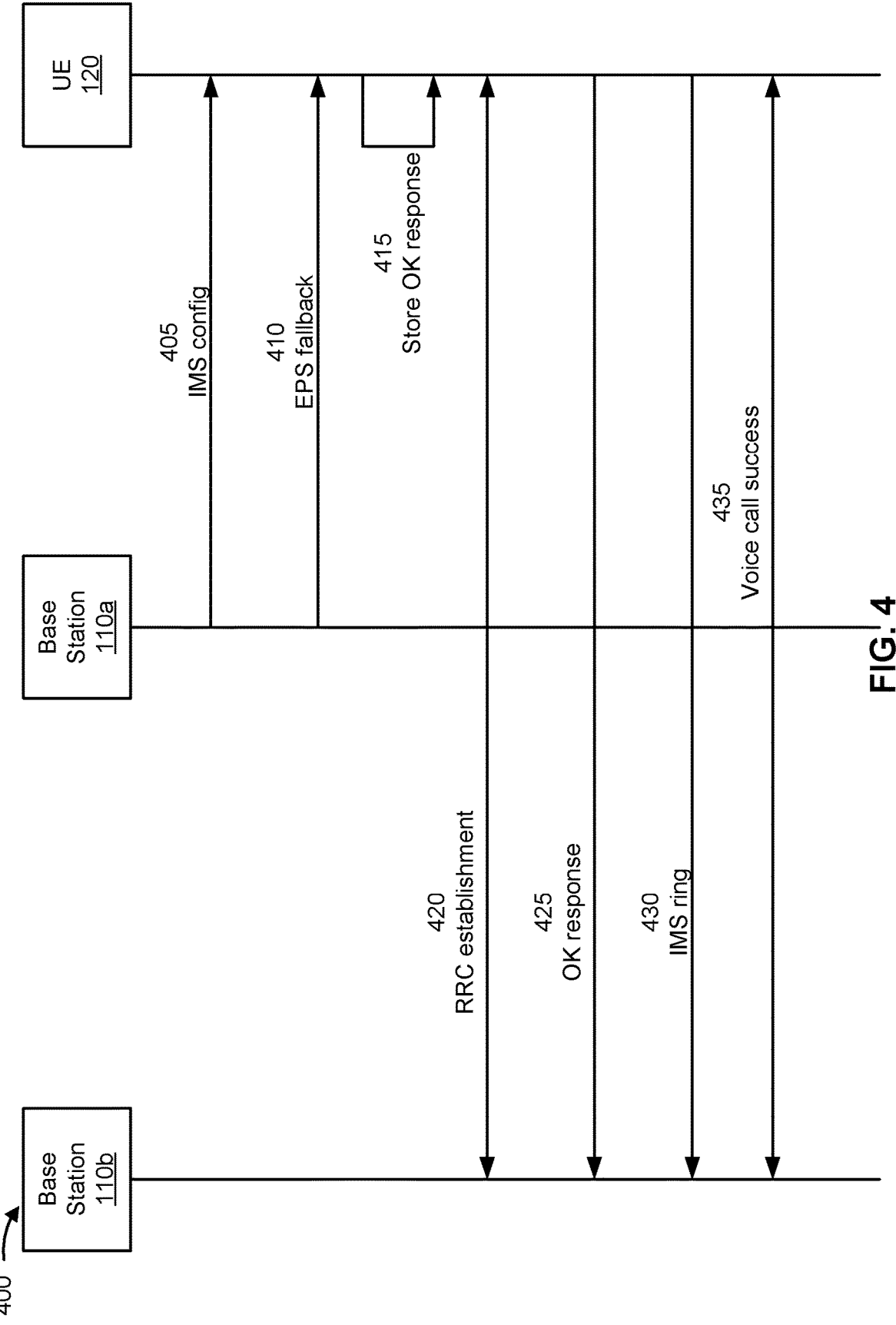
FIG. 4 is a diagram illustrating an example associated with Internet protocol (IP) multimedia subsystem (IMS) signaling during fallback to a legacy cell, in accordance with various aspects of the present disclosure.

FIG. 4 is a diagram illustrating an example 400 associated with IMS signaling during fallback to a legacy cell, in accordance with various aspects of the present disclosure. As shown in FIG. 4, example 400 includes communication between a base station 110a and a UE 120 and between a base station 110b and a UE 120. In some aspects, the base station 110a and the UE 120 may be included in a wireless network, such as wireless network 100. For example, the base station 110a may be included in an NR cell of a 5G network. Similarly, the base station 110b and the UE 120 may be included in another wireless network. For example, the base station 110b may be included in a legacy cell of a legacy network (e.g., an LTE network and/or another legacy network). In some aspects, the NR cell and the legacy cell may share an IMS architecture such that the NR cell can initiate an IMS session that is finalized and conducted on the legacy cell, as described in further detail below.

In example 400, the UE 120 may be connected to the base station 110a and may request a voice call. Accordingly, as shown in connection with reference number 405, the base station 110a may transmit, and the UE 120 may receive, an IMS configuration message. For example, the base station 110a may transmit an INVITE message as defined in RFC 3312 and/or another standard. Additionally, after reserving one or more resources on the IMS architecture, the base station 110a may transmit an UPDATE message as defined in RFC 3312 and/or another standard. An IMS session may allow the base station 110a to deliver IP multimedia services to the UE 120 in order to use IP packet switching to handle the requested voice call. For example, VoNR and VoLTE may both rely on IMS.

As shown in connection with reference number 410, the base station 110a may transmit, and the UE 120 may receive, an instruction to fallback to a legacy cell. For example, the base station 110a may transmit an RRCConnectionReconfiguration message as defined in 3GPP specifications and/or another standard. EPS fallback may allow the UE 120 to use the legacy cell to complete the requested voice call. For example, NR coverage may be less reliable where the UE 120 is located such that the base station 110a initiates EPS fallback in order to reduce a risk that the requested voice call will be dropped. Additionally, or alternatively, the UE 120 and/or the base station 110a may not support VoNR.

As shown in connection with reference number 415, the UE 120 may store a response to the IMS configuration message based at least in part on receiving the instruction to fallback. For example, the UE 120 may generate a 200 OK message (e.g., as defined in RFC 3312 and/or another standard) based at least in part on receiving the IMS configuration message. However, the UE 120 may receive the instruction to fallback before transmitting the response. Accordingly, the UE 120 may store the response instead. For example, the UE 120 may store the response as a PDU within a PDCP entity.

In some aspects, the UE 120 may determine that a PDU that includes the response is associated with a 5QI that maps to a stored 5QI value. For example, the response may be associated with a 5QI that maps to a 5QI value of 5 according to 3GPP Technical Specification 23.501 and/or another standard. Accordingly, the UE 120 may store the response based at least in part on the determination.

In some aspects, the UE 120 may further discard one or more additional PDUs that are associated with one or more 5QIs that do not map to the stored 5QI value. For example, the UE 120 may release a PDCP entity associated with the 5G network (e.g., according to 3GPP Technical Specification 38.331 and/or another standard) and discard all PDUs expect the stored PDU including the response.

As shown in connection with reference number 420, the UE 120 may establish, with the base station 110b, an RRC connection. For example, the UE 120 may establish the RRC connection based at least in part on the instruction to fallback. In some aspects, the UE 120 may establish the RRC connection at least in part by establishing, with the base station 110b, an RACH.

As shown in connection with reference number 425, the UE 120 may transmit, and the base station 110b may receive, the response to the IMS configuration message before another IMS message. Accordingly, the IMS architecture can confirm one or more preconditions that were included in the UPDATE message. For example, the precondition may include a QoS indicator, an indicator that the UE 120 is configured as an EPS bearer, and/or another condition prerequisite to beginning the IMS session. Because the UE 120 is now configured as an EPS bearer on the legacy network and/or because the legacy network should provide sufficient QoS to the UE 120, the UE 120 may confirm the one or more preconditions in the response.

As shown in connection with reference number 430, the UE 120 may transmit, and the base station 110*b* may receive, an IMS ring after the response. For example, the UE may transmit a 180 Ringing message as defined in RFC 3312 and/or another standard.

Accordingly, as shown in connection with reference number 435, the UE 120 and the base station 110*b* may successfully setup the requested voice call. By using techniques as described in connection with FIG. 4, the UE 120 may preserve a PDU that includes an IMS response (e.g., a 200 OK message as defined in RFC 3312 and/or another standard) during fallback to the legacy network. Moreover, the UE 120 may transmit the IMS response to the legacy network after the UE 120 completes handover from the 5G network to the legacy network. As a result, an IMS session will be successfully established, and the voice call will not fail, which improves the reliability and quality of the voice call as well as improving a user's experience.

As indicated above, FIG. 4 is provided as an example. Other examples may differ from what is described with respect to FIG. 4.

FIG. 5 is a diagram illustrating an example process 500 performed, for example, by a UE, in accordance with various aspects of the present disclosure. Example process 500 is an example where the UE (e.g., apparatus 700 of FIG. 7 and/or UE 120) performs operations associated with IMS signaling during fallback to a legacy cell.

As shown in FIG. 5, in some aspects, process 500 may include receiving, from an NR cell, an IMS configuration message (block 510). For example, the UE (e.g., using reception component 702, depicted in FIG. 7) may receive, from the NR cell, the IMS configuration message, as described above.

As further shown in FIG. 5, in some aspects, process 500 may include receiving, from the NR cell, an instruction to fallback to a legacy cell (block 520). For example, the UE (e.g., using reception component 702) may receive, from the NR cell, the instruction to fallback to the legacy cell, as described above.

As further shown in FIG. 5, in some aspects, process 500 may include storing a response to the IMS configuration message based at least in part on receiving the instruction to fallback (block 530). For example, the UE (e.g., using storage component 708, depicted in FIG. 7) may store the response to the IMS configuration message, as described above.

As further shown in FIG. 5, in some aspects, process 500 may include transmitting, to the legacy cell and before transmitting another IMS message, the response to the IMS configuration message (block 540). For example, the UE (e.g., using transmission component 704, depicted in FIG. 7) may transmit, to the legacy cell and before transmitting another IMS message, the response to the IMS configuration message, as described above.

Process 500 may include additional aspects, such as any single aspect or any combination of aspects described below and/or in connection with one or more other processes described elsewhere herein.

In a first aspect, the UE does not support VoNR.

In a second aspect, alone or in combination with the first aspect, process 500 further includes determining (e.g., using determination component 710, depicted in FIG. 7) that a PDU that includes the response is associated with 5QI that maps to a stored value, and the response is stored based at least in part on the determination.

In a third aspect, alone or in combination with one or more of the first and second aspects, process 500 further includes discarding (e.g., using storage component 708) one or more additional PDUs that are associated with one or more 5QIs that do not map to the stored 5QI value.

In a fourth aspect, alone or in combination with one or more of the first through third aspects, process 500 further includes transmitting (e.g., using transmission component 704), to the legacy cell, an IMS ring message after transmitting the response.

In a fifth aspect, alone or in combination with one or more of the first through fourth aspects, process 500 includes establishing (e.g., using reception component 702 and/or transmission component 704), with the legacy cell, an RRC connection before transmitting the response.

In a sixth aspect, alone or in combination with one or more of the first through fifth aspects, the RRC connection is established at least in part by establishing (e.g., using reception component 702 and/or transmission component 704), with the legacy cell, an RACH.

In a seventh aspect, alone or in combination with one or more of the first through sixth aspects, the response is stored as a PDU within a PDCP entity.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
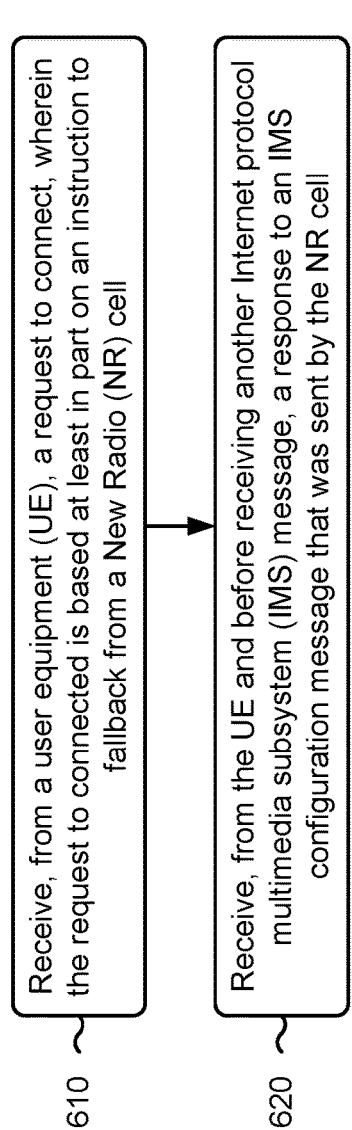

FIG. 6 is a diagram illustrating an example process 600 performed, for example, by a base station, in accordance with various aspects of the present disclosure. Example process 600 is an example where the base station (e.g., apparatus 800 of FIG. 8 and/or base station 110) performs operations associated with IMS signaling during fallback to a legacy cell.

As shown in FIG. 6, in some aspects, process 600 may include receiving, from a UE (e.g., apparatus 700 of FIG. 7 and/or UE 120), a request to connect (block 610). For example, the base station (e.g., using reception component 802, depicted in FIG. 8) may receive, from the UE, the request to connect, as described above. In some aspects, the request to connected is based at least in part on an instruction to fallback from an NR cell.

As further shown in FIG. 6, in some aspects, process 600 may include receiving, from the UE and before receiving another IMS message, a response to an IMS configuration message that was sent by the NR cell (block 620). For example, the base station (e.g., using reception component 802) may receive, from the UE and before receiving another IMS message, the response to the IMS configuration message that was sent by the NR cell, as described above.

Process 600 may include additional aspects, such as any single aspect or any combination of aspects described below and/or in connection with one or more other processes described elsewhere herein.

In a first aspect, the base station is associated with a legacy cell.

In a second aspect, alone or in combination with the first aspect, a PDU that includes the response is associated with a 5QI that maps to a stored 5QI value.

In a third aspect, alone or in combination with one or more of the first and second aspects, process 600 further includes receiving (e.g., using reception component 802), from the UE, an IMS ring message after receiving the response.

Figure 8:
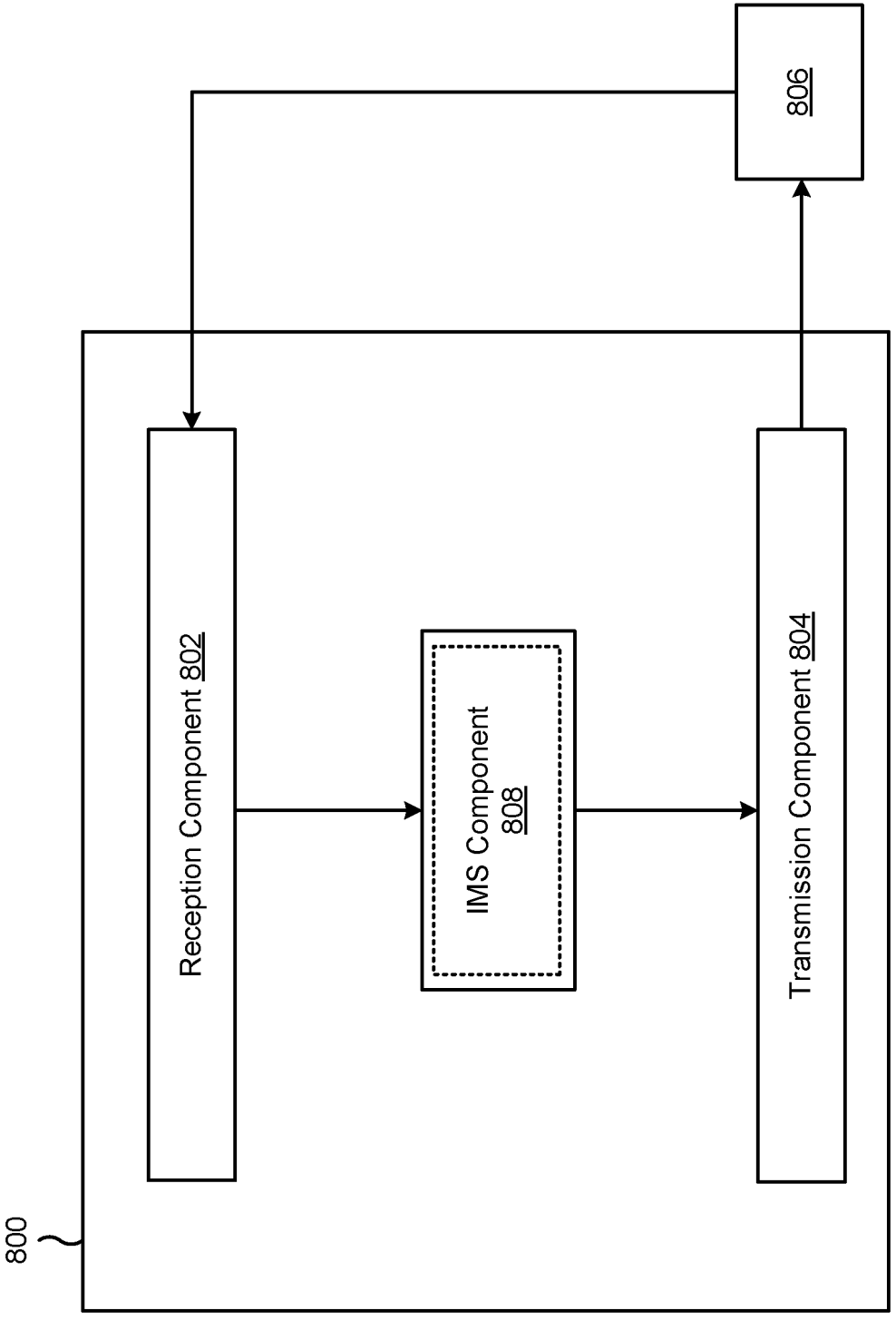

In a fourth aspect, alone or in combination with one or more of the first through third aspects, process 600 further includes establishing (e.g., using reception component 802 and/or transmission component 804, depicted in FIG. 8), with the UE, an RRC connection before receiving the response.

In a fifth aspect, alone or in combination with one or more of the first through fourth aspects, the RRC connection is established at least in part by establishing (e.g., using reception component 802 and/or transmission component 804), with the UE, an RACH.

In a sixth aspect, alone or in combination with one or more of the first through fifth aspects, the response is included in a PDU within a PDCP entity.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
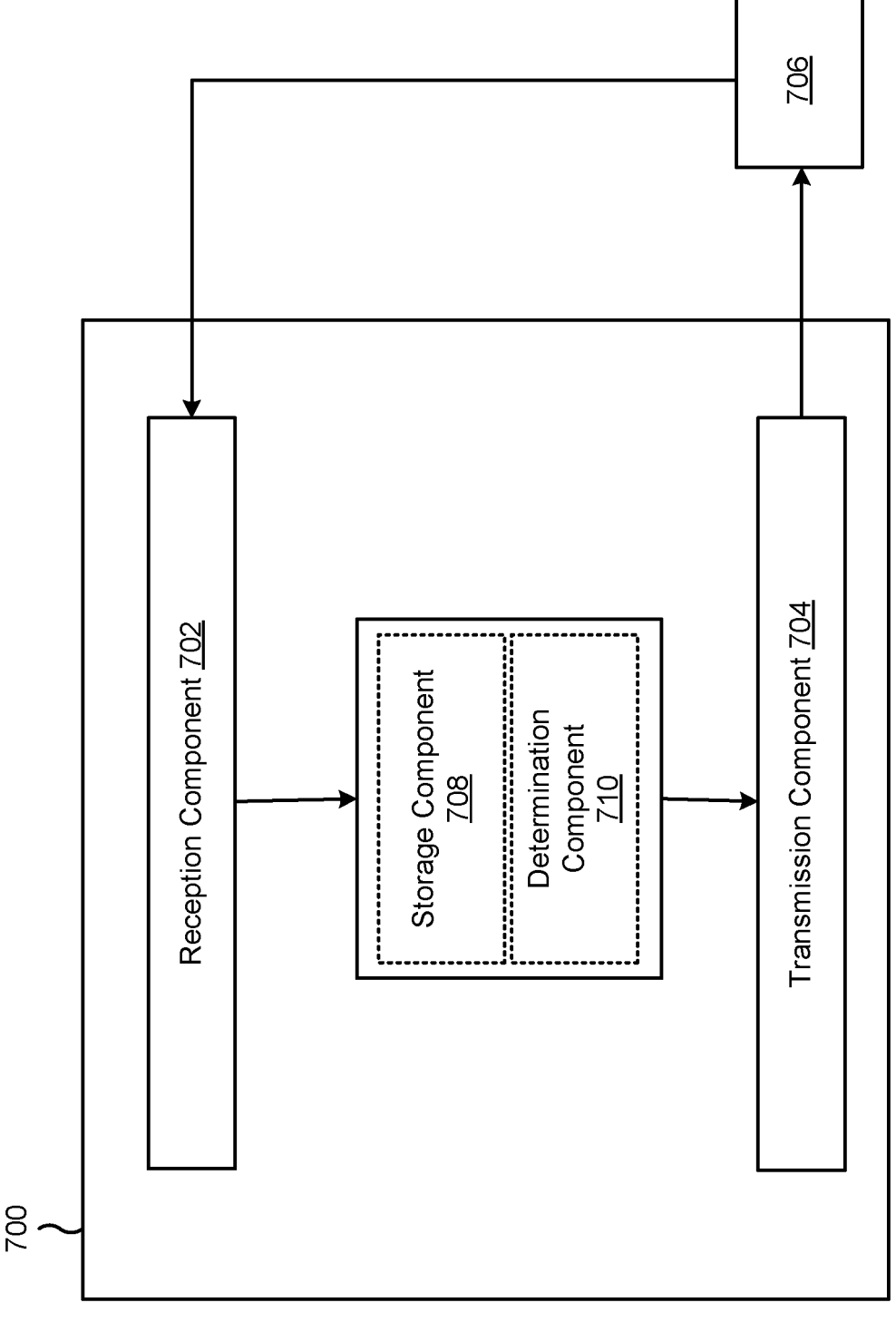
FIGS. 7-8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a storage component 708 or a determination component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

In some aspects, the reception component 702 may receive, from an NR cell (e.g., via apparatus 706), an IMS configuration message. Additionally, the reception component 702 may receive, from the NR cell (e.g., via apparatus 706), an instruction to fallback to a legacy cell. Accordingly, the storage component 708 may store a response to the IMS configuration message based at least in part on the reception component 702 receiving the instruction to fallback. In some aspects, the storage component 708 may include a transmit processor, a receive processor, a controller/processor, a memory, or a combination thereof, of the UE described above in connection with FIG. 2. Additionally, the transmission component 704 may transmit, to the legacy cell and before transmitting another IMS message, the response to the IMS configuration message.

In some aspects, the determination component 710 may determine that a PDU that includes the response is associated with a 5QI that maps to a stored 5QI value. In some aspects, the determination component 710 may include a transmit processor, a receive processor, a controller/processor, a memory, or a combination thereof, of the UE described above in connection with FIG. 2. Accordingly, the storage component 708 may store the response based at least in part on an output from the determination component 710.

In some aspects, the storage component 708 may discard one or more additional PDUs that are associated with one or more 5QIs that do not map to the stored 5QI value.

In some aspects, the transmission component 704 may transmit, to the legacy cell, an IMS ring message after transmitting the response. Additionally, or alternatively, the reception component 702 and/or the transmission component 704 may establish, with the legacy cell, an RRC connection before the transmission component 704 transmits the response.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an IMS component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

In some aspects, the reception component 802 may receive, from the apparatus 806, a request to connect. In some aspects, the request to connected is based at least in part on an instruction to fallback from an NR cell. Additionally, the reception component 802 may receive, from the apparatus 806 and before receiving another IMS message, a response to an IMS configuration message that was sent by the NR cell. For example, the IMS component 808 may have received, from an IMS architecture, information regarding an IMS session initiated by the NR cell. In some aspects, the IMS component 808 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

In some aspects, the reception component 802 may further receive, from the apparatus 806, an IMS ring message after receiving the response. Additionally, or alternatively, the reception component 802 and/or the transmission component 804 may establish, with the apparatus 806, an RRC connection before the reception component 802 receives the response.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a user equipment (UE), comprising: receiving, from a New Radio (NR) cell, an Internet protocol multimedia subsystem (IMS) configuration message; receiving, from the NR cell, an instruction to fallback to a legacy cell; storing a response to the IMS configuration message based at least in part on receiving the instruction to fallback; and transmitting, to the legacy cell and before transmitting another IMS message, the response to the IMS configuration message.

Aspect 2: The method of aspect 1, wherein the UE does not support voice over NR (VoNR).

Aspect 3: The method of any of aspects 1 through 2, further comprising: determining that a protocol data unit (PDU) that includes the response is associated with a 5G quality of service (QoS) identifier (5QI) that maps to a stored 5QI value, wherein the response is stored based at least in part on the determination.

Aspect 4: The method of aspect 3, further comprising: discarding one or more additional PDUs that are associated with one or more 5QIs that do not map to the stored 5QI value.

Aspect 5: The method of any of aspects 1 through 4, further comprising: transmitting, to the legacy cell, an IMS ring message after transmitting the response.

Aspect 6: The method of any of aspects 1 through 5, further comprising: establishing, with the legacy cell, a radio resource control (RRC) connection before transmitting the response.

Aspect 7: The method of aspect 6, wherein the RRC connection is established at least in part by establishing, with the legacy cell, a random access channel (RACH).

Aspect 8: The method of any of aspects 1 through 7, wherein the response is stored as a protocol data unit (PDU) within a packet data convergence protocol (PDCP) entity.

Aspect 9: A method of wireless communication performed by a base station, comprising: receiving, from a UE, a request to connect, wherein the request to connected is based at least in part on an instruction to fallback from an NR cell; and receiving, from the UE and before receiving another IMS message, a response to an IMS configuration message that was sent by the NR cell.

Aspect 10: The method of aspect 9, wherein the base station is associated with a legacy cell.

Aspect 11: The method of any of aspects 9 through 10, wherein a PDU that includes the response is associated with a 5QI that maps to a stored 5QI value.

Aspect 12: The method of any of aspects 9 through 11, further comprising: receiving, from the UE, an IMS ring message after receiving the response.

Aspect 13: The method of any of aspects 9 through 12, further comprising: establishing, with the UE, an RRC connection before receiving the response.

Aspect 14: The method of aspect 13, wherein the RRC connection is established at least in part by establishing, with the UE, an RACH.

Aspect 15: The method of any of aspects 9 through 14, wherein the response is included in a PDU within a PDCP entity.

Aspect 16: An apparatus for wireless communication at a device, comprising a processor; memory coupled with the processor; and instructions stored in the memory and executable by the processor to cause the apparatus to perform the method of one or more aspects of aspects 1-8.

Aspect 17: A device for wireless communication, comprising a memory and one or more processors coupled to the memory, the memory and the one or more processors configured to perform the method of one or more aspects of aspects 1-8.

Aspect 18: An apparatus for wireless communication, comprising at least one means for performing the method of one or more aspects of aspects 1-8.

Aspect 19: A non-transitory computer-readable medium storing code for wireless communication, the code comprising instructions executable by a processor to perform the method of one or more aspects of aspects 1-8.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-8.

Aspect 21: An apparatus for wireless communication at a device, comprising a processor; memory coupled with the processor; and instructions stored in the memory and executable by the processor to cause the apparatus to perform the method of one or more aspects of aspects 9-15.

Aspect 22: A device for wireless communication, comprising a memory and one or more processors coupled to the memory, the memory and the one or more processors configured to perform the method of one or more aspects of aspects 9-15.

Aspect 23: An apparatus for wireless communication, comprising at least one means for performing the method of one or more aspects of aspects 9-15.

Aspect 24: A non-transitory computer-readable medium storing code for wireless communication, the code comprising instructions executable by a processor to perform the method of one or more aspects of aspects 9-15.

Aspect 25: A non-transitory computer-readable medium storing a set of instructions for wireless communication, the set of instructions comprising one or more instructions that, when executed by one or more processors of a device, cause the device to perform the method of one or more aspects of aspects 9-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of:

a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
  one or more memories; and
  one or more processors, coupled to the one or more memories, configured to:
    receive, from a New Radio (NR) cell, an Internet protocol multimedia subsystem (IMS) configuration message;
    receive, from the NR cell, an instruction to fallback to a legacy cell;
    store a response to the IMS configuration message based at least in part on receiving the instruction to fallback; and
    transmit, to the legacy cell and before transmitting another IMS message, the response to the IMS configuration message.

2. The apparatus of claim 1,
  wherein the one or more processors are configured to:
    determine that a protocol data unit (PDU) that includes the response is associated with a 5G quality of service (QoS) identifier (5QI) that maps to a stored 5QI value, wherein the response is stored based at least in part on the determination.

3. The apparatus of claim 2,
  wherein the one or more processors are configured to:
    discard one or more additional PDUs that are associated with one or more 5QIs that do not map to the stored 5QI value.

4. The apparatus of claim 1,
  wherein the one or more processors are configured to:
    transmit, to the legacy cell, an IMS ring message after transmitting the response.

5. The apparatus of claim 1,
  wherein the one or more processors are configured to:
    establish, with the legacy cell, a radio resource control (RRC) connection before transmitting the response.

6. The apparatus of claim 5,
  wherein the RRC connection is established at least in part by establishing, with the legacy cell, a random access channel (RACH).

7. The apparatus of claim 1,
  wherein the response is stored as a protocol data unit (PDU) within a packet data convergence protocol (PDCP) entity.

8. A method of wireless communication performed by a user equipment (UE), comprising:
  receiving, from a New Radio (NR) cell, an Internet protocol multimedia subsystem (IMS) configuration message;
  receiving, from the NR cell, an instruction to fallback to a legacy cell;
  storing a response to the IMS configuration message based at least in part on receiving the instruction to fallback; and
  transmitting, to the legacy cell and before transmitting another IMS message, the response to the IMS configuration message.

9. The method of claim 8, further comprising:
  determining that a protocol data unit (PDU) that includes the response is associated with a 5G quality of service (QoS) identifier (5QI) that maps to a stored 5QI value, wherein the response is stored based at least in part on the determination.

10. The method of claim 9, further comprising:
  discarding one or more additional PDUs that are associated with one or more 5QIs that do not map to the stored 5QI value.

11. The method of claim 8, further comprising:
  transmitting, to the legacy cell, an IMS ring message after transmitting the response.

12. The method of claim 8, further comprising:
  establishing, with the legacy cell, a radio resource control (RRC) connection before transmitting the response.

13. The method of claim 12,
  wherein the RRC connection is established at least in part by establishing, with the legacy cell, a random access channel (RACH).

14. The method of claim 8,
  wherein the response is stored as a protocol data unit (PDU) within a packet data convergence protocol (PDCP) entity.

15. A non-transitory computer-readable medium storing a set of instructions for wireless communication, the set of instructions comprising:
  one or more instructions that, when executed by one or more processors of a user equipment (UE), cause the UE to:
    receive, from a New Radio (NR) cell, an Internet protocol multimedia subsystem (IMS) configuration message;
    receive, from the NR cell, an instruction to fallback to a legacy cell;
    store a response to the IMS configuration message based at least in part on receiving the instruction to fallback; and
    transmit, to the legacy cell and before transmitting another IMS message, the response to the IMS configuration message.

16. The non-transitory computer-readable medium of claim 15,
  wherein the one or more instructions, when executed by the one or more processors, cause the UE to:
    determine that a protocol data unit (PDU) that includes the response is associated with a 5G quality of service (QoS) identifier (5QI) that maps to a stored 5QI value, wherein the response is stored based at least in part on the determination.

17. The non-transitory computer-readable medium of claim 16, wherein the one or more instructions, when executed by the one or more processors, cause the UE to:

discard one or more additional PDUs that are associated with one or more 5QIs that do not map to the stored 5QI value.

18. The non-transitory computer-readable medium of claim 15, wherein the one or more instructions, when executed by the one or more processors, cause the UE to:

transmit, to the legacy cell, an IMS ring message after transmitting the response.

19. The non-transitory computer-readable medium of claim 15, wherein the one or more instructions, when executed by the one or more processors, cause the UE to:

establish, with the legacy cell, a radio resource control (RRC) connection before transmitting the response.

20. The non-transitory computer-readable medium of claim 19, wherein the RRC connection is established at least in part by establishing, with the legacy cell, a random access channel (RACH).

21. The non-transitory computer-readable medium of claim 15, wherein the response is stored as a protocol data unit (PDU) within a packet data convergence protocol (PDCP) entity.

22. An apparatus for wireless communication, comprising:

means for receiving, from a New Radio (NR) cell, an Internet protocol multimedia subsystem (IMS) configuration message;

means for receiving, from the NR cell, an instruction to fallback to a legacy cell;

means for storing a response to the IMS configuration message based at least in part on receiving the instruction to fallback; and means for transmitting, to the legacy cell and before transmitting another IMS message, the response to the IMS configuration message.

23. The apparatus of claim 22, further comprising:

means for determining that a protocol data unit (PDU) that includes the response is associated with a 5G quality of service (QoS) identifier (5QI) that maps to a stored 5QI value, wherein the response is stored based at least in part on the determination.

24. The apparatus of claim 23, further comprising:

means for discarding one or more additional PDUs that are associated with one or more 5QIs that do not map to the stored 5QI value.

25. The apparatus of claim 22, further comprising:

means for transmitting, to the legacy cell, an IMS ring message after transmitting the response.

26. The apparatus of claim 22, further comprising:

means for establishing, with the legacy cell, a radio resource control (RRC) connection before transmitting the response.

27. The apparatus of claim 26, wherein the RRC connection is established at least in part by establishing, with the legacy cell, a random access channel (RACH).

28. The apparatus of claim 22, wherein the response is stored as a protocol data unit (PDU) within a packet data convergence protocol (PDCP) entity.

* * * * *